United States Patent [19]
Baba et al.

[11] Patent Number: 4,872,058
[45] Date of Patent: Oct. 3, 1989

[54] AUTOMATIC FOCUSING DEVICE

[75] Inventors: Takeshi Baba, Kanagawa; Yukichi Niwa, Chiba, both of Japan

[73] Assignee: Canon Kabushiki Kaisha, Tokyo, Japan

[21] Appl. No.: 106,427

[22] Filed: Oct. 8, 1987

[30] Foreign Application Priority Data

Oct. 8, 1986 [JP] Japan ................... 61-239786

[51] Int. Cl.⁴ ........................... H04N 5/238
[52] U.S. Cl. ..................... 358/227; 354/402; 354/430
[58] Field of Search ............... 354/400, 402, 404, 405, 354/406, 407, 408; 358/227

[56] References Cited

U.S. PATENT DOCUMENTS 4,320,417 3/1982 Hanma et al. ............. 358/227
4,392,726 7/1983 Kimura ..................... 358/227
4,611,244 9/1986 Hanma et al. ............. 358/227
4,614,975 9/1986 Kaite ....................... 354/402
4,647,979 3/1987 Urata ....................... 354/430

Primary Examiner—Russell E. Adams
Attorney, Agent, or Firm—Robin, Blecker, Daley & Driscoll

[57] ABSTRACT

An automatic focusing device which is arranged to perform a focusing action by detecting the peak value of a high frequency component of a video signal obtained from within a focus detecting area set on the image sensing plane of an image sensor and by driving a photo taking optical system in such a way as to increase the detected peak value comprises: a peak position detecting circuit which locates a position on the image sensing plane at which the peak value of the high frequency component of the video signal is detected; and a gate control circuit which changes the position of the focus detecting area in accordance with the detected peak position which is located by the peak position detecting circuit.

40 Claims, 8 Drawing Sheets

AUTOMATIC FOCUSING DEVICE

BACKGROUND OF THE INVENTION

1. Field of the Invention

This invention relates to an automatic focusing device for a video camera, an electronic camera, etc. arranged to automatically perform a focusing action using a video signal produced from an image sensor or the like.

2. Description of the Related Art

Automatic focusing devices of varied kinds have been known. For a video camera, an electronic camera or a like apparatus of the kind using an image sensor, there is known a method of focusing by detecting the sharpness of the image of an object formed on an image sensing plane through a video signal obtained from the image sensor and by driving an optical system to a position where a maximum degree of sharpness is obtained. The sharpness of an object's image is determinable in principle according to the largeness or smallness of the high frequency component of an image signal. For example, the high frequency component of an image (or video) signal is extracted by means of a high-pass filter or a differentiating circuit. Then, a focal point is adjusted by driving a photo taking optical system until the high frequency component reaches a peak value. With regards to the automatic focusing device of the above stated kind, a method called "hill climbing servo method" which is described in detail in "NHK GIJUTSU KENKYU," 1965, Vol. 17, No. 1, (Whole No. 86), p 21 to p 37, has long been well known. A basic circuit arrangement of these prior art methods is as shown in FIG. 1 of the accompanying drawings. A gate circuit 12 is arranged to extract, from an image signal which is produced from an image sensor 10, a signal corresponding to a given area (a middle area of an image plane in general) set for detection of the focused state of the image plane. A high-pass filter 14 is arranged to extract a high frequency component of the signal output of the gate circuit 12. A peak detecting circuit 16 is arranged to detect the peak value of the high frequency component of the image signal for the image plane (or one frame or one field). A direction determining circuit 18 is arranged to determine the shifting direction of an image sensing optical system 20 by comparing the peak value detected by the peak detecting circuit 16 with the peak value of the previous image plane. The direction determining circuit 18 causes, by controlling the motor driving circuit 22, a motor 24 to rotate in the same direction as before if the detected peak value is found to have increased from the previous peak value and to rotate in the reverse direction if the peak value is found to have decreased from the previous peak value. In the event of no substantial change in the value, the motor 24 is caused to stop from rotating.

The above stated conventional method, however, has presented the following problems: First, since the focus detecting area is set at a fixed part on the image plane, the detected value of the high frequency component tends to fluctuate to a great degree as the image is caused to move into or out of the focus detecting area by the shaking of hands or by the movement of the object to be photographed. Then, the optical system would be driven in a wrong direction. The optical system would fail to come to a stop and fluctuate when an in-focus stat is obtained. Secondly, some images other than a desired object's image commingle with the latter within the focus detecting area. If such other images include, for example, a flickering lamp or the like, an erroneous focusing action also would result from such a condition.

To eliminate the possibility of such an erroneous action, an automatic follow-up detecting device and an automatic follow-up device have been disclosed in U.S. patent application Ser. No. 737,163, filed May 23, 1985, assigned to the same assignee as the assignee of the present invention. The devices disclosed are arranged to store the features of an object (or a main photographing object); to detect and incessantly follow-up the movement of the object; and to be capable of setting a focus detecting area always appositely to the position of the object. In accordance with this method, the focus detecting area is arranged to follow the movement of the object. The method, therefore, prevents any erroneous action that results from shaking unsteady hands, a move of the object or a coexisting object which is not desired.

However, since the movement of the object is followed generally by using information on an image signal, the above stated method necessitates the use of a memory for storing a feature of the object such as a pattern of the object and a high-speed correlation computing circuit for computing the moving extent of the object. This prior art method thus has necessitated a large-scale, expensive circuit arrangement.

SUMMARY OF THE INVENTION

It is a first object of this invention to provide an automatic focusing device which is arranged to solve the problems of the prior art described in the foregoing and yet is capable of accurately focusing a photo taking optical system on an object to be photographed.

It is a second object of this invention to make by simple arrangement an automatic focusing device which is capable of accurately focusing a photo taking optical system on an object to be photographed.

To attain this object, a focusing device which is arranged according to this invention to detect a focal point by taking out a focus signal corresponding to a focused degree from a video signal obtained from within a focus detecting area set on the image sensing plane of image sensing means comprises: peak detecting means for detecting the peak value of the focus signal corresponding to a focused degree obtained from within the focus detecting area; position detecting means for detecting a focus position at which the peak value is detected within the detecting area on the image sensing plane; and position control means for controlling the position of the focus detecting area according to the output of the position detecting means. The device which is arranged as described above detects, at the beginning of a focusing action, the position of a focusing object either from within an area designated on an image plane by the operator or from within a middle area of the image plane and forms a focus signal. After that, the focus detecting area is changed, every time the image plane changes, to an area in which the position of the focusing object has been included on a preceding image plane and the focus signal is formed for the new focus detecting area. In other words, any movement of the focusing object is monitored and the focus detecting area is changed following the movement of the object, so that the focused state of a photo taking lens always can be detected on one and the same object. Then, the direction in which the position of the photo taking lens is to be shifted is determined either on the basis of a focus signal obtained from a single image plane or on the basis of the result of comparison between focus signals obtained from consecutive image planes as applicable. The optical system is thus can be controlled to bring it into an in-focus state.

Since the focus detecting area is arranged to be changed following any change in position of the object, the invented device ensures great improvement with respect to an erroneous action resulting from a movement of the object or unsteady hands. Further, in accordance with this invention, the movement of the object is discriminated by using a parameter which indicates a focusing state on the object. This arrangement obviates the necessity of any additional arrangement for detecting the movement of the object t be photographed and thus permits simplification of structural arrangement of the device.

Other objects and features of the invention will become apparent from the following detailed description of an embodiment thereof taken in connection with the accompanying drawings.

DETAILED DESCRIPTION OF THE PREFERRED EMBODIMENT

Figure 1:
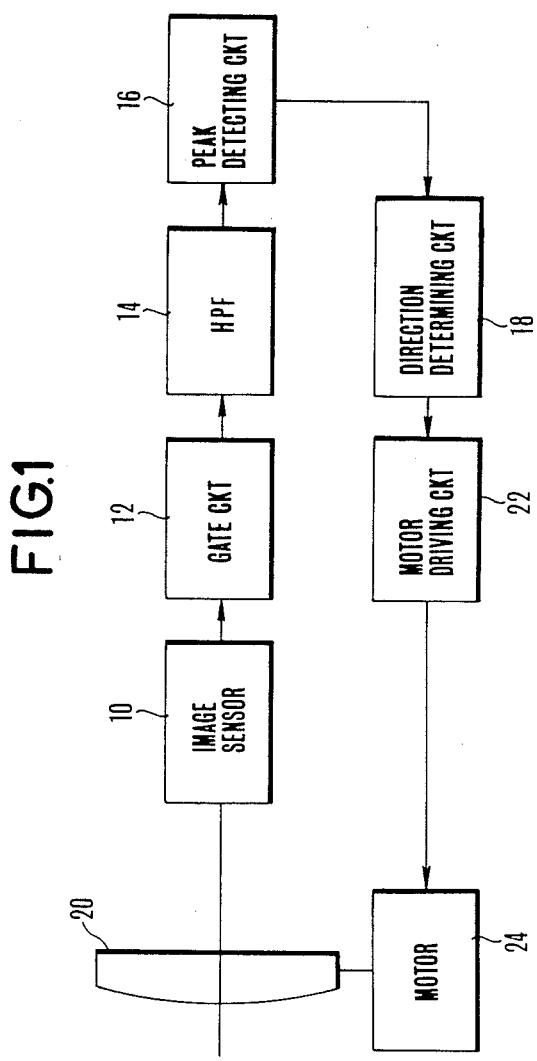
FIG. 1, is a block diagram showing the conventional automatic focusing device.
Figure 2:
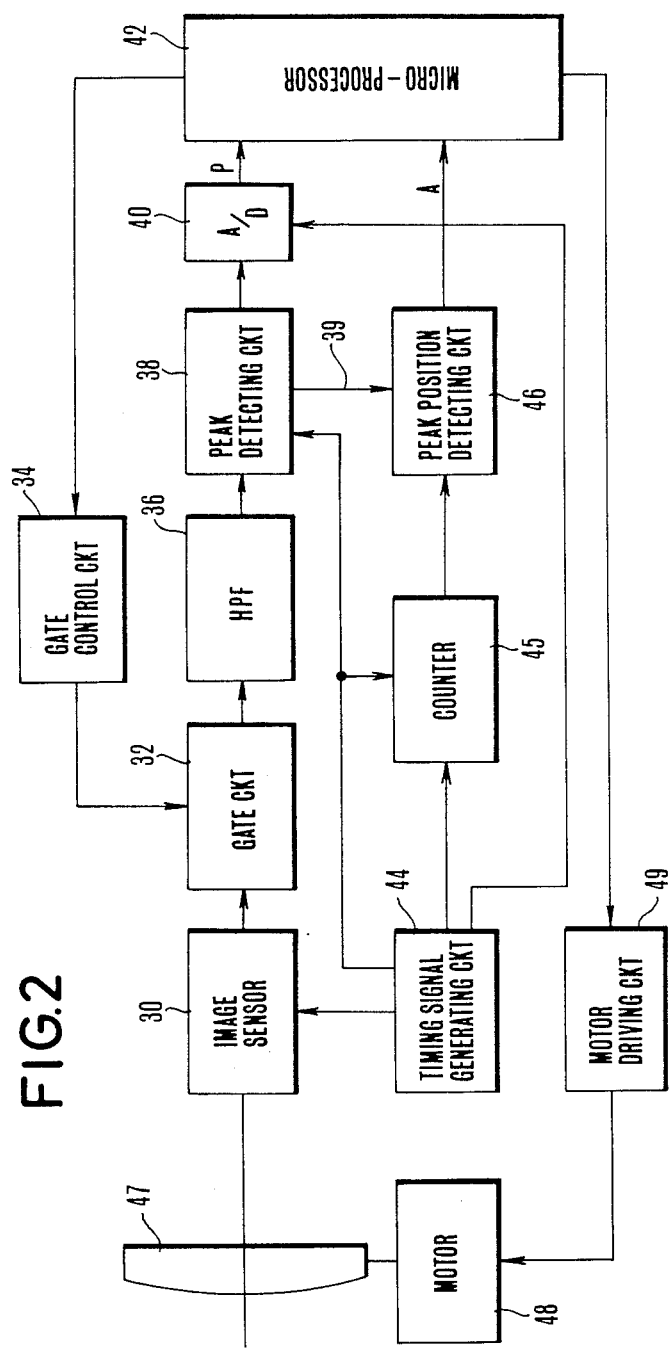
FIG. 2 is a block diagram showing in outline the arrangement of an automatic focusing device embodying this invention.

The following describes an embodiment of this invention with reference to the accompanying drawings:

Referring to FIG. 2 which shows the arrangement of the embodiment in a block diagram, an image sensor 30 is a two-dimensional image sensor of the MOS type, the CCD type or the like. A gate circuit 32 is arranged to pass a portion of an image signal produced from the image sensor 30 which is obtained from within a designated focus detecting area set on the image sensing plane of the image sensor. The passing period of the gate circuit 32 is determined by a control signal produced from a gate control circuit 34. A high-pass filter (HPF) 36 is arranged to extract a high frequency component from the signal output of the gate circuit 32. The high frequency component may be arranged to be extracted by means of a differentiating circuit or the like instead of the HPF 36. A peak detecting circuit 38 is arranged to receive the output of the HPF 36 and to detect the peak value of the high frequency component of the image signal portion obtained from the focus detecting area. An analog-to-digital (A/D) converter 40 is arranged to convert the peak value obtained from the peak detecting circuit 38 into a digital value and supplies the digital value to a micro-processor 42.

The micro-processor 42 is arranged to control the gate control circuit 34 in accordance with a routine, which will be described later herein, in such a manner that the position and the size of the focus detecting area are adjusted by changing the passing period of the gate circuit 32. A timing signal generating circuit 44 is arranged to generate a timing signal which is used for driving the image sensor 30 and for defining the operation timing of the peak detecting circuit 38, the A/D converter 40 and a counter 45. The counter 45 is arranged to count the pulses of a clock signal generated by the timing signal generating circuit 44 and to measure a length of time elapsing from a point of time at which vertical scanning begins. A peak position detecting circuit 46 is arranged to latch the count value of the counter 45 obtained when a peak value is detected through a peak detection signal 39 which is generated by the peak detecting circuit 38 upon detection of the peak value. The latched count value is supplied to the micro-processor 42. The count value of the counter 45 which is obtained when the peak value is detected represents the position or location of the peak value on the image plane. The contents of the peak detecting circuit 38 and the counter 45 are cleared when vertical scanning begins.

Upon completion of the vertical scanning action on each image plane, the micro-processor 42 reads and takes in a peak value P (the output of the A/D converter 40) and a peak position A (the output of the peak position detecting circuit 46). The micro-processor 42 then controls a motor driving circuit 49 in the direction of increasing the peak value P and, at the same time, instructs the gate control circuit 34 to change the passing period of the gate circuit 32 (i.e. the position and size of the focus detecting area) in accordance with any change in the peak position A. In accordance with the control signal from the micro-processor 42, a motor 48 which is arranged to drive a photo taking optical system 47 is caused by the motor driving circuit 49 to rotate in the instructed direction or to come to a stop.

Figure 3A:
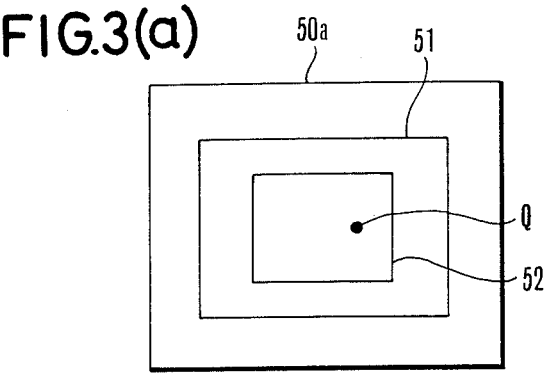
FIGS. 3(a) to 3(c) are illustrations of a manner in which a focus detecting area is changed by the device of FIG. 2.
Figure 3B:
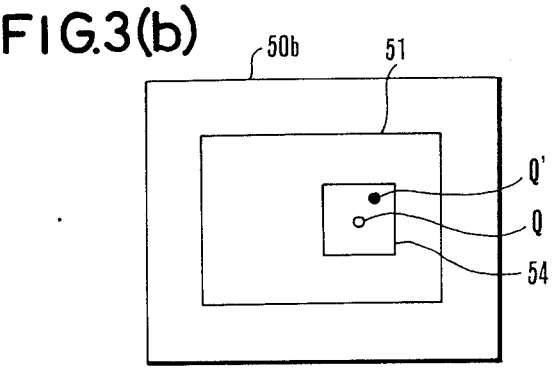
Figure 3C:
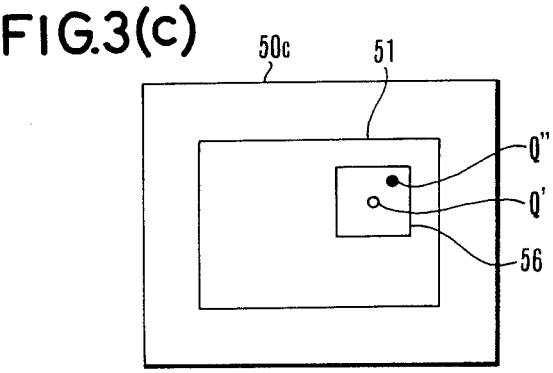
Figure 4:
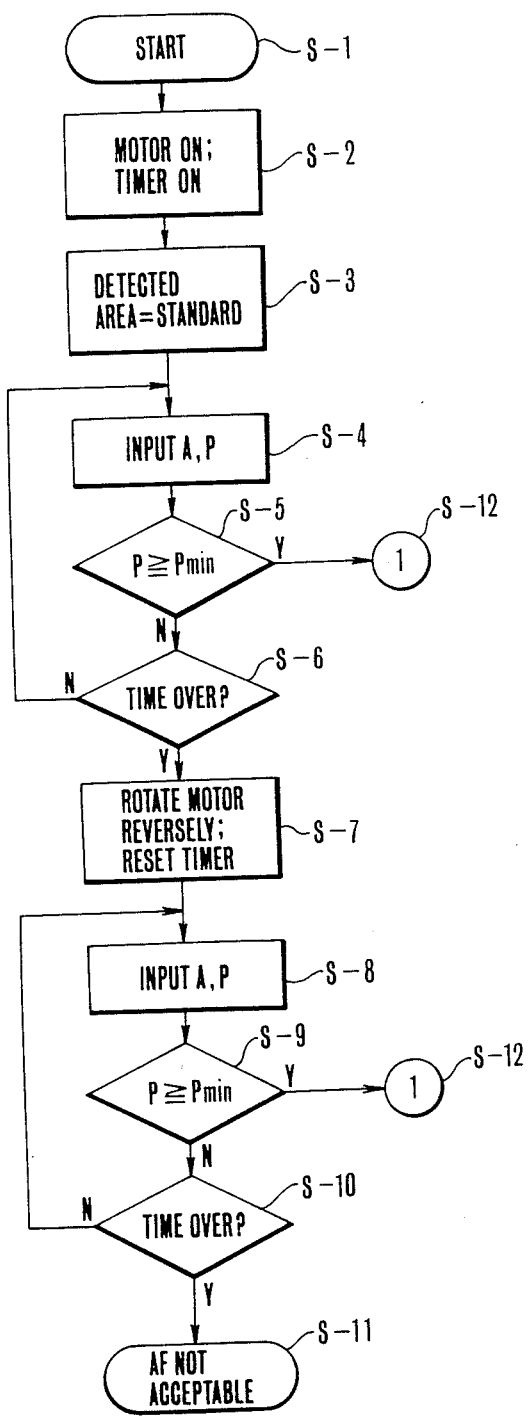
FIGS. 4, 5, 6, 7, and 8 are flow charts showing the operation of a micro-processor shown in FIG. 2.

FIGS. 3(a) to 3(c) show the focus detecting area as being changed by the micro-processor 42 from one state over to another. Namely, the whole image plane changes from a state 50a to a state 50b and further to another state 50c in the order of FIGS. 3(a), 3(b) and 3(c).

At a starting point of time for an automatic focusing action, the motor 48 begins to drive or rotate. At the same time, for locking the focusing action on a focusing object, a standard focus detecting area 52 is set at a suitable size in the middle part of the whole image plane 50a as shown in FIG. 3(a). Then, the peak value Pa of the high frequency component of the image signal and the peak position Q of the high frequency component are detected from within the focus detecting area. The value of the high frequency component of the image signal is large at a part where the luminance of the object's contour or the like changes. Therefore the peak position Q is a point on the contour of the object and, on the ensuing image plane 50b, the point Q shifts to a nearby point Q' according to shaking or vibrations of hands or a movement of the object. Therefore, the miro-processor 42 changes the focus detecting area to a smaller area 54 on the next image plane 50b with the peak position Q of the preceding image plane located in the middle of the new image plane 50b as shown in FIG. 3(b). Then, a new peak value Pb and its position Q' are detected from within the smaller area 54. The peak value Pb is compared with the preceding peak value Pa. The direction in which the motor 48 is to be driven is determined according to the result of comparison. The position of the photo taking optical system 47 is shifted in that direction. On the further image plane 50c, the focus detecting area is set at a small area 56 which has the peak position Q' in the middle thereof as shown in FIG. 3(c). Then, a peak value Pc and its position Q" are detected from within the renewed focus detecting area 56.

After that, the focus detecting area are adjusted according as the peak position changes. Compared with the initial focus detecting area 52, each of the ensuing detecting areas is narrow as they are just covering a limited area around the known peak position, so that focus determining computation and focusing control can be promptly carried out. Further, in preparation for cases where the peak positions Q, Q' and Q" shift to an edge part of the image plane, a follow-up area 51 is set beforehand. In case that the detected peak position repeatedly comes out of the follow-up area 51, it is judged that the focusing object has been changed from one object to another by a panning action or the like. In that case, the focus detecting area is brought back to the initial detecting area 52 of FIG. 3(a) and the automatic focusing action is resumed from the beginning over again.

The initial focus detecting area can be set in any desired part of the image plane 50a at the start of a photographing action in response to an instruction given by the operator. With the device arranged in that manner, a focusing action can be locked on a desired object with the camera kept in a fixed state. Further, the camera is preferably provided with some means for giving an instruction to reset or restart a focusing action.

FIGS. 4 to 8 are flow charts showing the operation of the micro-processor 42. The micro-processor 42 begins to operate at a step S-1 of FIG. 4 either after a power supply is switched on or in response to an instruction for commencement of a focusing action. Then, at a step S-2: The motor 48 begins to perform a driving action in a desired direction. A timer which is provided for detecting arrival of the photo taking optical system 47 at its end position which is an infinity distance position or a nearest distance position is turned on. The timer begins to measure the lapse of time. At a step S-3: Next, a standard focus detecting area is set in the middle part of the image plane (the area 52 of FIG. 3(a)). Step S-4: Upon completion of a vertical scanning process, the peak value P of the high frequency component and the position A of the peak value on the applicable image plane are read out and taken in. Step S-5: The peak value P is compared with a noise level Pmin. In the event of P≧Pmin, the flow of operation branches out to a step S-12 of FIG. 5. If P<Pmin, the flow proceeds to a step S-6. At the step S-6: The timer is checked for the measured time.

If the timer does not show the lapse of a sufficient length of time for the arrival of the photo taking optical system 47 at the infinity distance position or the nearest distance position, the flow of operation comes back to the step S-4. If it shows the lapse of a sufficient length of time, the flow proceeds to a step S-7. Step S-7: The rotating direction of the motor 48 is reversed and the above stated timer is reset. Step S-8: Again the peak value P and its position A are obtained. Step S-9: A check is made to see if an effective peak value P which is larger than the noise level Pmin has been detected. In case of P≧Pmin, the flow branches out to the Step S-12 of FIG. 5 in the same manner as in the case of the step S-5. In the event of P<Pmin, the flow of operation comes to a step S-10. Step S-10: The timer is check to see if it indicates the lapse of a sufficient length of time for arrival of the photo taking optical system 47 at the end position (infinity distance or nearest distance position). If so, it means impossibility of obtaining any in-focus point over the whole shifting range of the photo taking optical system 47, due to insufficient illumination or due to some other reasons. Step S-11: In that case, a warning is displayed for example within a view finder. Then, after waiting for the lapse of a given length of time, the flow of operation comes back to the step S-1 to perform, for example, the focusing action over again.

Figure 5:
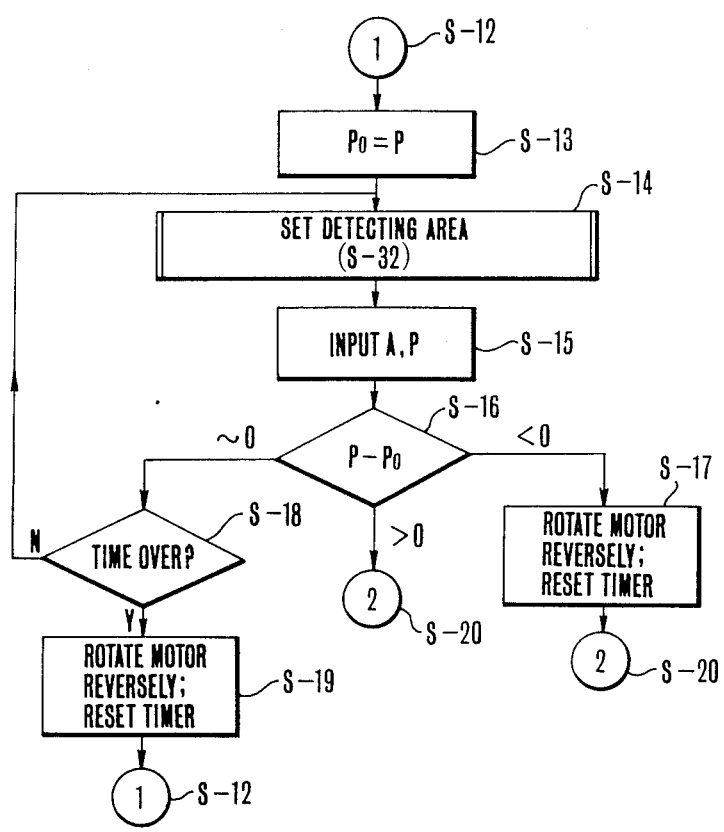

Referring to FIG. 5, steps S-12 to S-19 show a routine for detecting the increasing direction of the peak value P of the high frequency component which is found to be larger than the noise level Pmin at the step S-5 or the step S-9. At the step S-13: The peak value P is temporarily kept at a variable Po. Step S-14: A detecting area is set by calling a step S-32 of FIG. 8.

Figure 8:
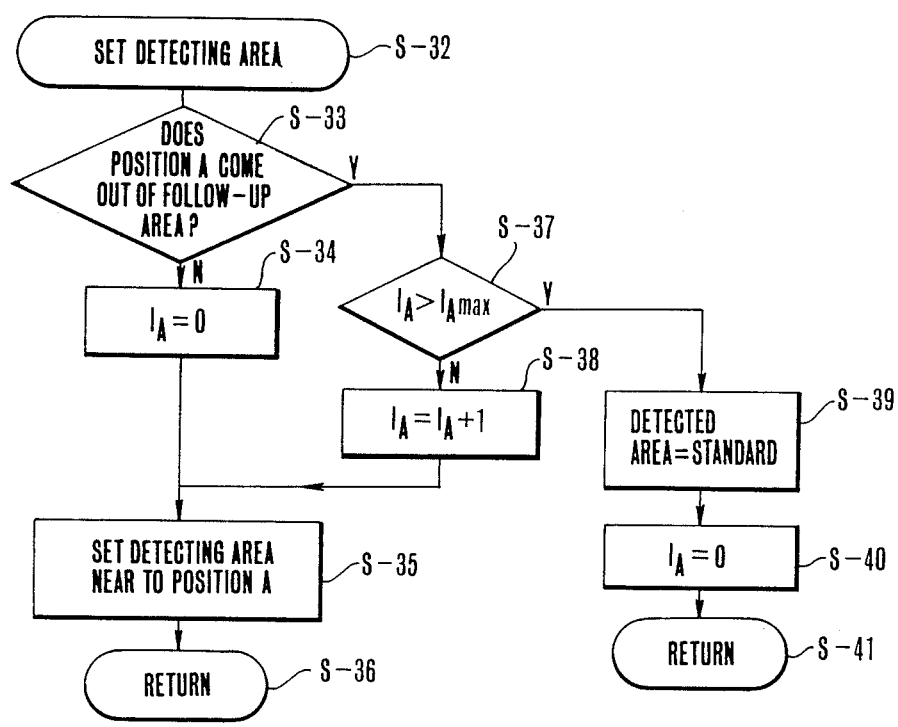

In the steps S-32 to S-41 which are as shown in FIG. 8, the peak position A detected by the peak position detecting circuit 46 is checked at the step S-33 to see if it is out of the follow-up area 51 shown in FIG. 3(a). A reference symbol IA denotes a counter which is arranged to count, at the step S-34, the number of image planes on which the peak position A is found to be outside of the follow-up area 51. At the step S-34: The timer IA is reset if the peak position A is found to be within the follow-up area 51. Step S-35: The focus detecting area is changed for a next image plane to the smaller detecting area 54 or 56 having the detected peak position A in the middle part thereof as shown in FIGS. 3(b) or 3(c). Step S-37: If the peak position A is found to be outside of the follow-up area 51 at the step S-33, a check is made to see if the peak position A continues to be outside of the follow-up area 51 for a predetermined period of time by comparing the count value of the counter IA with a predetermined value IAmax. If the result of comparison is IA>IAmax thus indicating that the detected peak position A remains outside of the follow-up area 51 over the predetermined period of time, it means that the object to be photographed stays outside of the area 51 for a long period of time. Therefore, the initial object is assumed to have been changed to another object by panning or the like. Steps S-39, S-40 and S-41: In that event, the focus detecting area is brought back to the initial (or standard) detecting area 52 which is as shown in FIG. 3(a). The timer IA is reset. The flow of operation returns. Then, the focusing action is performed on the new object.

Further, if the result of comparison made at the step S-37 is IA≦IAmax thus indicating that the above stated predetermined period of time has not elapsed as yet, the flow of operation comes to the step S-38. At the Step S-38: The count value of the counter IA is increased by 1. Steps S-35 and S-36: The focus detecting area is changed to a detecting area around the detected peak position A. The flow of operation returns.

Figure 6:
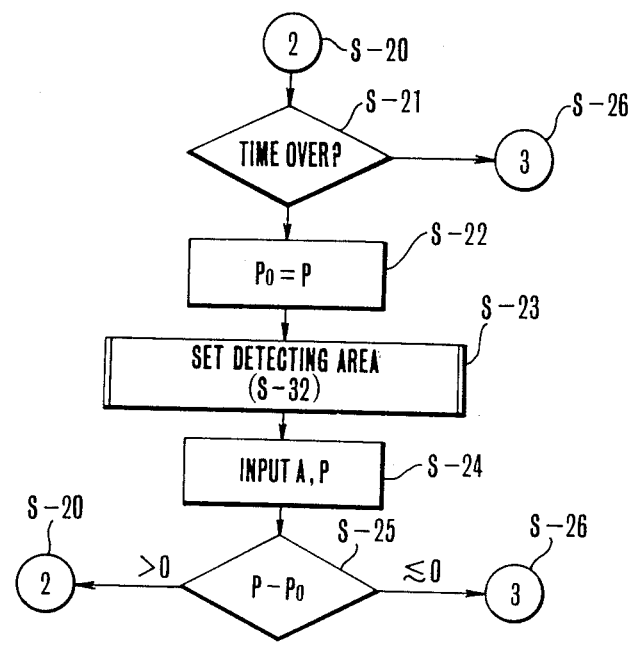

Again referring to FIG. 5, after the focusing area is set at the step S-14 as mentioned in the foregoing, the flow comes to a step S-15. Step S-15: The peak value P and its position A is read and taken in. Step S-16: A discrimination is made between an increase and a decrease in the peak value P. If it is found to be P−Po>0 thus indicating an increase, the flow branches out to a step S-20 (FIG. 6). In the event of P−Po<0 which indicates a decrease, the flow of operation comes to a step S-17. Step S-17: The rotation of the motor 48 is reversed and then the flow comes to the step S-20. In case that no substantial change is found at the step S-16, the peak value P is continuously checked at the steps S-14, S-15 and S-16. Step S-18: At the same time, the timer which indicates the position of the photo taking optical system 47 is checked. If the photo taking optical system 47 is found to have reached its end position, the flow comes to a step S-19. At the step S-19: The motor 48 is reversely rotated and the timer is reset. The flow then comes back to the step S-12 to repeat the steps described in the foregoing.

In FIG. 6, steps S-20 to S-25 show a routine for detecting an in-focus point when the motor 48 is driven in the direction of increasing the peak value P of the high frequency component. At the step S-21: The timer is checked to find if the photo taking optical system has reached its end position. If so, the flow proceeds to a step S-26 (FIG. 7) to perform processes required when the optical system is in focus. If not, the peak value detecting process is continuously performed at the ensuing steps S-22 to S-25. AT the steps S-22 to S-24: The processes are performed in the same manner as in the steps S-13 to S-15 of FIG. 5. When the peak value P passes a maximum value and begins to decrease, the flow of operation branches to the step S-26 of FIG. 7.

Figure 7:
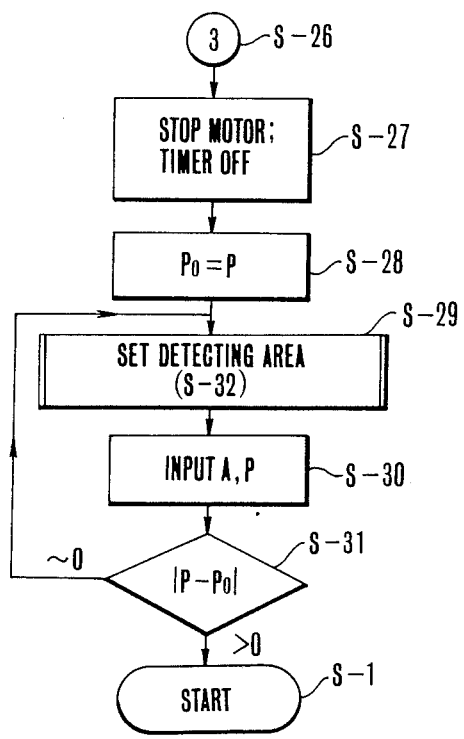

Referring to FIG. 7, steps S-26 to S-31 show a processing routine to be executed in the case of an in-focus state. At the step S-27: The driving action of the motor 48 and the operation of the timer are brought to a stop. At the steps S-28 to S-31: With the peak value P kept at the value Po, the detected peak value P is checked continuously to see if it has changed from the value Po. If a change is found, the optical system is assumed to have come out of focus and the flow of operation comes to the step S-1 to perform the focusing action over again.

In the case of the embodiment described, the sharpness of the image is evaluated and the focus detecting area is changed on the basis of a single peak value and its position within the whole image plane. However, it is of course possible to change this arrangement to use a plurality of peak values instead of one peak value. For example, the arrangement may be changed as follow: The peak value of the high frequency component and its position detected for every horizontal scanning line within the focus detecting area; an average of the peak values thus obtained is used as the sharpness value of the image; then, for a next image plane, the focus detecting area is changed to an area either covering all the peak values or an area is newly set around these peak values for every horizontal scanning action. In order to read and take in the plurality of peak values and their positions, the peak detection signal 39 which is supplied from the peak detecting circuit 38 to the peak position detecting circuit 46 is arranged to be supplied also to the micro-processor 42 as a reading start signal.

The embodiment shown in FIG. 2 is arranged to detect the high frequency component obtained in the horizontal scanning direction. Therefore, the focus detecting areas 54 and 56 which are shown in FIGS. 3(b) and 3(c) may be changed from their square shape into a vertically oblong shape. Further, it should be noted that the focus detecting areas shown in FIGS. 3(a) to 3(c) are exaggerated for the sake of illustration.

The HPF 34 shown in FIG. 2 may be replaced with a circuit which is arranged to obtain the absolute value of a difference between the signal values of horizontally adjacent picture elements and that of a difference between the signal values of vertically adjacent picture elements. This modification enables the device to detect not only the high frequency component in the horizontal scanning direction but also the high frequency component in the vertical scanning direction. In the foregoing description, a timer is employed by way of example in finding whether the photo taking optical system 47 is in the end position thereof. However, the use of the timer for that purpose may be replaced with a microswitch by arranging it at the end position of the optical system to open or close according as the optical system is in or out of the end position.

Further, the direct use of the peak value P of the high frequency component may be replaced with the use of a value obtained by normalizing the value P with an average illuminance obtained in the focus detecting area. By that modification, the adverse effect of changes in illuminating conditions, etc. can be eliminated. Further, it is possible to employ a focus detecting method of obtaining a focus signal from a time differential signal of the image signal within one field or one frame.

In accordance with this invention, the focus detecting area is arranged to be varied following the movement of an object's image. The invented arrangement prevents erroneous actions due to a movement of the object to be photographed or unsteadiness of hands. Further, the movement of the object is detected by using a parameter which is indicative of a focusing state on the object. This obviates the necessity of any additional arrangement for detecting the movement of the object and thus permits simplification of the structural arrangement of the device.

What is claimed is:

1. A focus detecting device for detecting a focal point by obtaining a focus signal corresponding to a focused degree from a video signal obtained from within a focus detecting area which is set on the image sensing plane of image sensing means, comprising:

(a) peak detecting means for detecting a substantial peak value of said focus signal corresponding to a focused degree obtained from within said focus detecting area;

(b) position detecting means for detecting a position at which said peak value is detected within said focus detecting area on said image sensing plane; and (c) position control means for controlling the position of said focus detecting area according to the output of said position detecting means.

2. A device according to claim 1, further comprising focal point adjusting means which is arranged to perform a focusing action by driving a photo taking optical system in the direction of increasing the peak value detected by said peak detecting means.

3. A device according to claim 1, wherein said peak detecting means is arranged to detect the peak value of the high frequency component of a video signal obtained from within said focus detecting area.

4. A device according to claim 3, wherein said peak detecting means and said position detecting means are arranged to detect the peak value of said high frequency component and the detected position thereof within said focus detecting area every time a vertical scanning action is performed on said image sensing plane.

5. A device according to claim 1, wherein said position control means is arranged to shift the focus detecting area to such a position as to have the peak position which is detected by said position detecting means located in the middle part of said focus detecting area.

6. A device according to claim 1, wherein said position control means is arranged to vary the size of said focus detecting area as well as to control the position of said focus detecting area on said image sensing plane.

7. A device according to claim 5, wherein said position control means is arranged to reduce the size of said focus detecting area after said focus detecting area which is detected by said position detecting means is shifted to a new position.

8. A device according to claim 1, wherein said position control means is arranged to set said focus detecting area in the middle part of the image sensing plane in a predetermined size as a standard focus detecting area at the beginning of a focus detecting action.

9. A device according to claim 1, wherein a restricting area is set on said image sensing plane to limit the shiftable range of said focus detecting area.

10. A device according to claim 8, wherein said position control means is arranged to bring said focus detecting area back to said standard focus detecting area when the detected position on said image sensing plane of said peak value obtained from within said focus detecting area has remained outside of said restricting area for more than a predetermined period of time.

11. A device according to claim 3, wherein said position control means is arranged not to shift said focus detecting area when said peak value obtained from within said focus detecting area is below a predetermined level.

12. A device according to claim 2, wherein said focal point adjusting means is arranged to drive and shift said photo taking optical system to the end of an optical system shifting range when the peak value detected by said peak detecting means is below a predetermined level; and to bring the focal point adjusting action thereof to a stop when said peak value remains below said predetermined level throughout the whole shifting range.

13. A device according to claim 1, wherein said peak detecting means includes a peak detecting circuit which is arranged to produce a peak detection signal every time the peak value of the high frequency component of the video signal obtained by scanning said image sensing plane is detected; said position detecting means includes a counter which is arranged to be reset for every vertical scanning action on said image sensing plane and a peak position detecting circuit which is arranged to produce the count value of said counter as position information in response to said peak detection signal; and said position control means includes a gate control circuit which is arranged to control the focus detecting area on said image sensing plane by varying the passing range of said video signal and a microprocessor which is arranged to control said gate control circuit on the basis of the output of said peak detecting circuit and that of said peak position detecting circuit.

14. A device for following an object imaged on an image sensing plane, comprising:
(a) peak detecting means for detecting a substantial peak value of a high frequency component obtained within a follow-up area set on said image sensing plane;
(b) position detecting means for detecting a position at which said peak value is detected on said image sensing plane within said follow-up area; and
(c) position control means for controlling the position of said follow-up area according to the output of said position detecting means.

15. A device according to claim 14, wherein said follow-up area is used also as a focus detecting area within which the degree of focus on an object to be photographed is detected.

16. A device according to claim 14, wherein said peak detecting means is arranged to detect the peak value of said high frequency component obtained by every vertical scanning action on said image sensing plane; and said position detecting means is arranged to detect the position on said image sensing plane of said peak value every time said vertical scanning action is performed.

17. A device according to claim 14 or 16, wherein said position control means is arranged to change the position of said follow-up area to a peak detecting position detected by said position detecting means.

18. A device according to claim 17, wherein said position control means is arranged to vary the size of said follow-up area.

19. A device according to claim 17, wherein, on said image sensing plane, there is set a follow-up limit area for limiting the shiftable limit of said follow-up area.

20. A device according to claim 19, wherein said position control means is arranged to set, at the beginning of the follow-up action of the device, said follow-up area in the middle part of said image sensing plane as an initial area which is of a predetermined size.

21. A device according to claim 20, wherein said position control means is arranged to set said follow-up area in said initial area in case that the detected position of said peak value on said image sensing plane remains outside of said follow-up limit area for more than a predetermined period of time.

22. A device for detecting a movement of an object to be photographed, comprising:
(a) peak detecting means for detecting a substantial peak value of a high frequency component obtained from within a detecting area set on an image sensing plane;
(b) location detecting means for detecting a location at which said peak value is detected on said image sensing plane;
(c) movement detecting means for detecting a movement of said object on the basis of changes in the output of said location detecting means; and
(d) shifting means for shifting said detecting area to the location of said peak value detected by said location detecting means.

23. A device according to claim 22, wherein said peak detecting means and said location detecting means are arranged to operate every time a vertical scanning action is performed on said image sensing plane.

24. A focus detecting device for detecting a focal point by obtaining a focus signal corresponding to a focused degree from a video signal obtained from within a focus detecting area which is set on the image sensing plane of image sensing means, comprising:
(a) peak detecting means for detecting a substantial peak value of said focus signal corresponding to a focused degree obtained from said video signal within said focus detecting area;
(b) position detecting means for detecting a position at which said peak value is detected within said focus detecting area on said image sensing plane; and
(c) control means for controlling the position of said focus detecting area according to the output of said position detecting means and for controlling the size of said focus detecting area according to the controlling operation of the position of said focus detecting area.

25. A device according to claim 24, wherein said control means is arranged to vary at least the size of said focus detecting area in two steps to a standard size and to a predetermined size smaller than said standard size and to change over the size before and after shifting of said focus detecting area.

26. A device according to claim 25, wherein said position control means is arranged to reduce the size of said focus detecting area after said focus detecting area which is detected by said position detecting means is shifted to a new position.

27. A device according to claim 25 or 26, wherein a restricting area is set on said image sensing plane to limit the shiftable range of said focus detecting area.

28. A device according to claim 27, wherein said position control means is arranged to bring said focus detecting area back to said standard focus detecting area when the detected position on said image sensing plane of said peak value obtained from within said focus detecting area has remained outside of said restricting area for more than a predetermined period of time.

29. A focus detecting device for detecting a focal point by obtaining a focus signal corresponding to a focused degree from a image signal obtained from image sensing means, comprising:
 (a) peak detecting means for detecting the peak value of a predetermined component of said image signal obtained within a follow-up area set on said image sensing plane;
 (b) position detecting means for detecting a position at which said peak value is detected on said image sensing plane within said follow-up area;
 (c) position control means for controlling the position of said follow-up area according to the output of said position detecting means; and
 (d) focus detecting means arranged to set a focus detecting area at said follow-up area, to obtain said focus signal corresponding to the focus degree from the image signal within said focus detecting area and to detect the focus degree.

30. A device according to claim 29, wherein said follow-up area and said focus detecting area are commonly used.

31. A device according to claim 29, wherein said predetermined component of said image signal is a high frequency component contained in said image signal.

32. A device according to claim 29, wherein said focus signal is a high frequency component contained in said image signal.

33. A device according to claim 29, further comprising focal point adjusting means which is arranged to perform a focusing action by driving a photo taking optical system in the direction of increasing the peak value detected by said peak detecting means.

34. A device according to claim 31, wherein said peak detecting means is arranged to detect the peak value of said high frequency component obtained by every vertical scanning action on said image sensing plane; and said position detecting means is arranged to detect the position on said image sensing plane of said peak value every time said vertical scanning action is performed.

35. A device according to claim 34, wherein said position control means is arranged to change the position of the follow-up area to a peak detecting position detected by said position detecting means.

36. A device according to claim 35, wherein said position control means is arranged to vary the size of said follow-up area.

37. A device according to claim 35, wherein, on said image sensing plane, there is set a follow-up limit area for limiting the shiftable limit of said follow-up area.

38. A device according to claim 37, wherein said position control means is arranged to set, at the beginning of the follow-up action of the device, said follow-up area in the middle part of said image sensing plane as an initial area which is of a predetermined size.

39. A device according to claim 36, wherein said position control means is arranged to vary the size of the follow-up area before and after the follow-up operation and to decrease the size according to the follow-up operation.

40. A device according to claim 36, wherein said focus detecting means is arranged to vary the size of the focus detecting area before and after the shifting of the set position based on said positioning means and to decrease the focus detecting area after the shifting.

* * * * *